(12) United States Patent
Aono et al.

(10) Patent No.: US 11,888,202 B2
(45) Date of Patent: Jan. 30, 2024

(54) FUEL CELL STACK

(71) Applicant: TOYOTA BOSHOKU KABUSHIKI KAISHA, Aichi-ken (JP)

(72) Inventors: Haruyuki Aono, Aichi-ken (JP); Takenori Koyanagi, Susono (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/845,258

(22) Filed: Jun. 21, 2022

(65) Prior Publication Data

US 2022/0416271 A1    Dec. 29, 2022

(30) Foreign Application Priority Data

Jun. 25, 2021 (JP) ................................. 2021-105501

(51) Int. Cl.
*H01M 8/2457* (2016.01)
*H01M 8/04082* (2016.01)
*H01M 8/2465* (2016.01)
*H01M 8/04119* (2016.01)
*H01M 8/2483* (2016.01)

(52) U.S. Cl.
CPC ..... *H01M 8/2457* (2016.02); *H01M 8/04156* (2013.01); *H01M 8/04201* (2013.01); *H01M 8/2465* (2013.01); *H01M 8/2483* (2016.02)

(58) Field of Classification Search
CPC ........... H01M 8/04201; H01M 8/2457; H01M 8/2465; H01M 8/04156; H01M 8/2483

USPC ......................................................... 429/400
See application file for complete search history.

(56) References Cited

U.S. PATENT DOCUMENTS

| | | | | |
|---|---|---|---|---|
| 2008/0118809 A1* | 5/2008 | Tighe | ................ | H01M 8/0258 429/458 |
| 2008/0292936 A1* | 11/2008 | Silberbauer | ......... | H01M 8/2483 429/409 |
| 2008/0311461 A1* | 12/2008 | Farrington | .......... | H01M 8/0258 429/454 |
| 2012/0122008 A1* | 5/2012 | Ko | ........................ | B60L 3/0053 429/458 |
| 2018/0040905 A1* | 2/2018 | Wilkosz | .............. | H01M 8/0206 |
| 2019/0214656 A1 | 7/2019 | Ishida et al. | | |

FOREIGN PATENT DOCUMENTS

JP        2019-121562 A        7/2019

\* cited by examiner

*Primary Examiner* — James M Erwin
(74) *Attorney, Agent, or Firm* — Greenblum & Bernstein, P.L.C.

(57) ABSTRACT

A fuel cell stack includes power generation cells, which are stacked in a vertical direction. Each power generation cell is configured to generated power by using gas. Each power generation cell includes a first hole and a second hole. The first holes of the power generation cells form a gas manifold. The gas manifold extends in the vertical direction, and the gas flows through the gas manifold. The second holes of the power generation cells form a passage. The passage is adjacent to the gas manifold and extends in the vertical direction. The gas manifold and the passage are connected to each other at upper ends of the gas manifold and the passage.

4 Claims, 3 Drawing Sheets

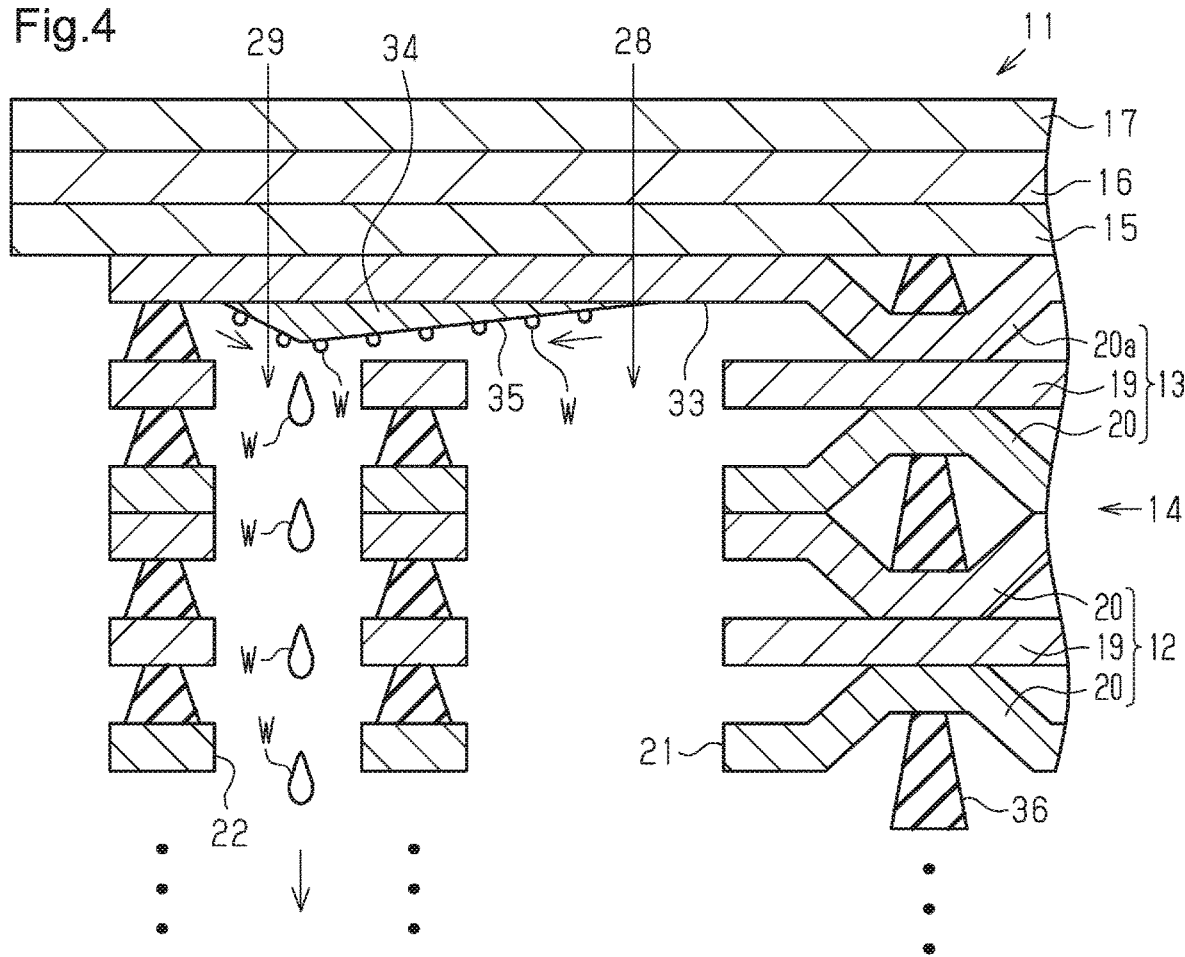

FUEL CELL STACK

BACKGROUND

1. Field

The present disclosure relates to a fuel cell stack.

2. Description of Related Art

Japanese Laid-Open Patent Publication No. 2019-121562 discloses a fuel cell stack. The fuel cell stack includes power generation cells that are stacked in a horizontal direction. Each power generation cell has a shape of a rectangular plate. Each power generation cell includes a plastic frame, an electrolyte membrane electrode structure, a first metal separator, and a second metal separator. The first metal separator and the second metal separator hold the plastic frame and the electrolyte membrane electrode structure between them. The electrolyte membrane electrode structure includes a solid polymer electrolyte membrane, an anode, and a cathode. The anode and the cathode hold the solid polymer electrolyte membrane between them.

The fuel cell stack includes a gas manifold, which extends horizontally, and a drain (passage), which extends horizontally at a position below the gas manifold. The gas manifold and the drain extend through the power generation cells. The gas manifold and the drain are connected to each other at their ends on one side in the horizontal direction. The drain discharges water generated during operation of the fuel cell stack.

The above-described fuel cell stack is configured such that the gas manifold and the drain extend horizontally and are connected to each other at their ends, and that the gas manifold is located above the drain. Thus, when the fuel cell stack operates so that the temperature of the fuel cell stack is relatively high, water vapor in gas in the gas manifold hardly flows to the drain.

On the other hand, when the fuel cell stack stops operating so that the temperature of the fuel cell stack is relatively low, water vapor condenses in the gas manifold so that a significant amount of liquid water is generated in the gas manifold. When a significant amount of liquid water is generated in the gas manifold, the liquid water may flow into pipes connected to the gas manifold and freeze, for example, in a cold climate area. This can cause valves in the pipes to malfunction. As such, there is room for improvement in reducing the amount of liquid water generated by condensation of water vapor in the gas manifold.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel cell stack includes power generation cells that are stacked in a vertical direction. The power generation cells are each configured to generate power by using a gas. Each power generation cell includes a membrane electrode assembly, a support frame that supports the membrane electrode assembly, and two separators that hold the membrane electrode assembly and the support frame between the separators. Each power generation cell includes a first hole and a second hole. The first holes of the power generation cells form a gas manifold. The gas manifold extends in the vertical direction, and the gas flowing through the gas manifold. The second holes of the power generation cells form a passage. The passage is adjacent to the gas manifold and extending in the vertical direction. The gas manifold and the passage are connected to each other at upper ends of the gas manifold and the passage.

Other features and aspects will be apparent from the following detailed description, the drawings, and the claims.

BRIEF DESCRIPTION OF THE DRAWINGS

FIG. 4 is an enlarged partial view of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A fuel cell stack 11 according to one embodiment will now be described with reference to the drawings.

Figure 1:
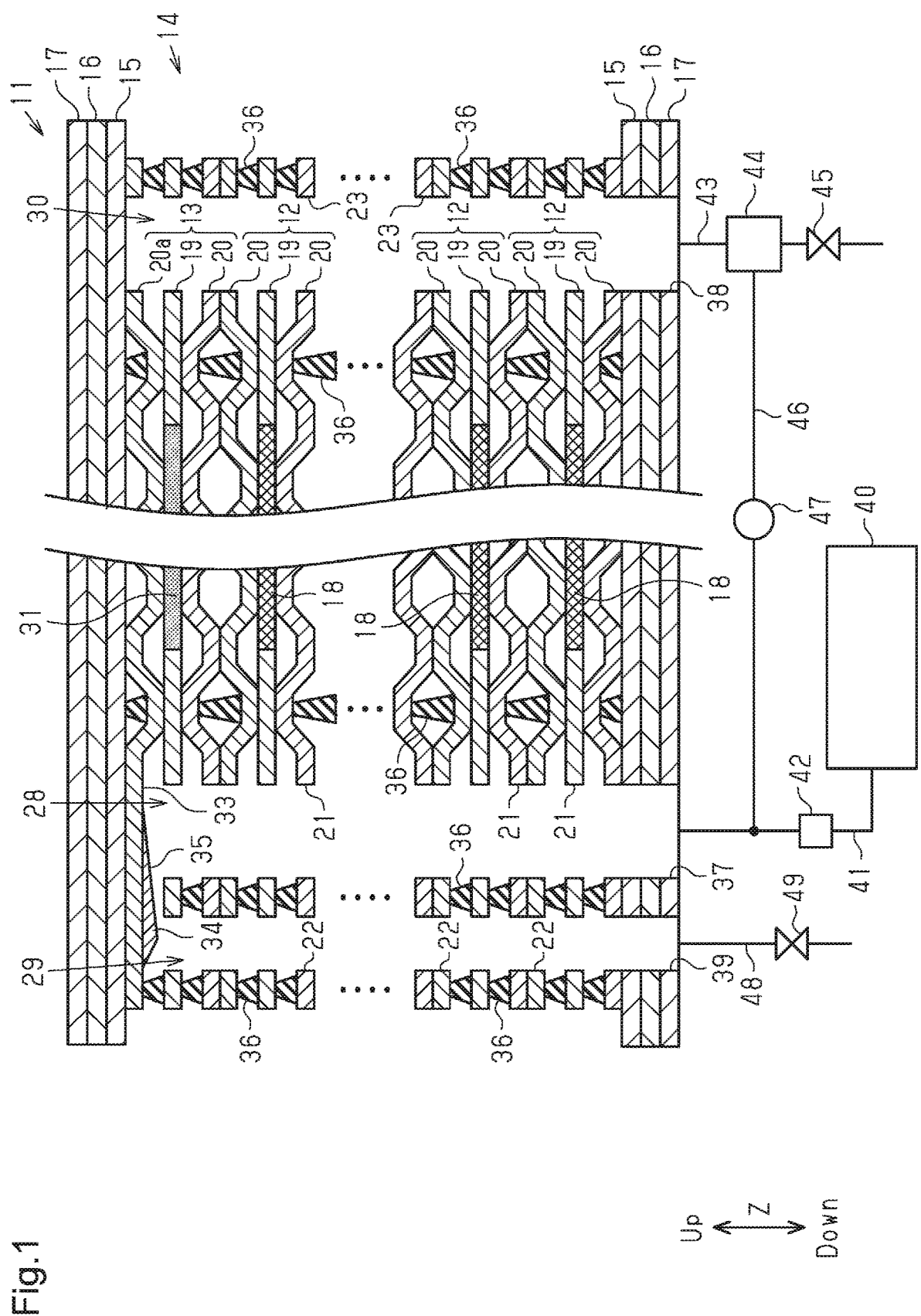
FIG. 1 is an end view of a fuel cell stack according to one embodiment.

As shown in FIG. 1, the fuel cell stack 11 includes a cell stack body 14. The cell stack body 14 includes rectangular plate-shaped power generation cells 12 and a rectangular plate-shaped dummy cell 13. The power generation cells 12 and the dummy cell 13 are stacked in a thickness direction. The power generation cells 12 generate power by using fuel gas containing hydrogen and oxidant gas containing oxygen. The dummy cell 13 does not generate power. The power generation cells 12 and the single dummy cell 13 are stacked in a vertical direction Z.

The dummy cell 13 is stacked on the top one of the stacked power generation cells 12. That is, the dummy cell 13 is located at the top of the cell stack body 14. An end plate 17 is arranged at each of the upper and lower ends of the cell stack body 14 with a terminal plate 15 and an insulating plate 16 between the end plate 17 and the cell stack body 14. The terminal plates 15 collect power, and the insulating plates 16 perform insulation.

Figure 2:
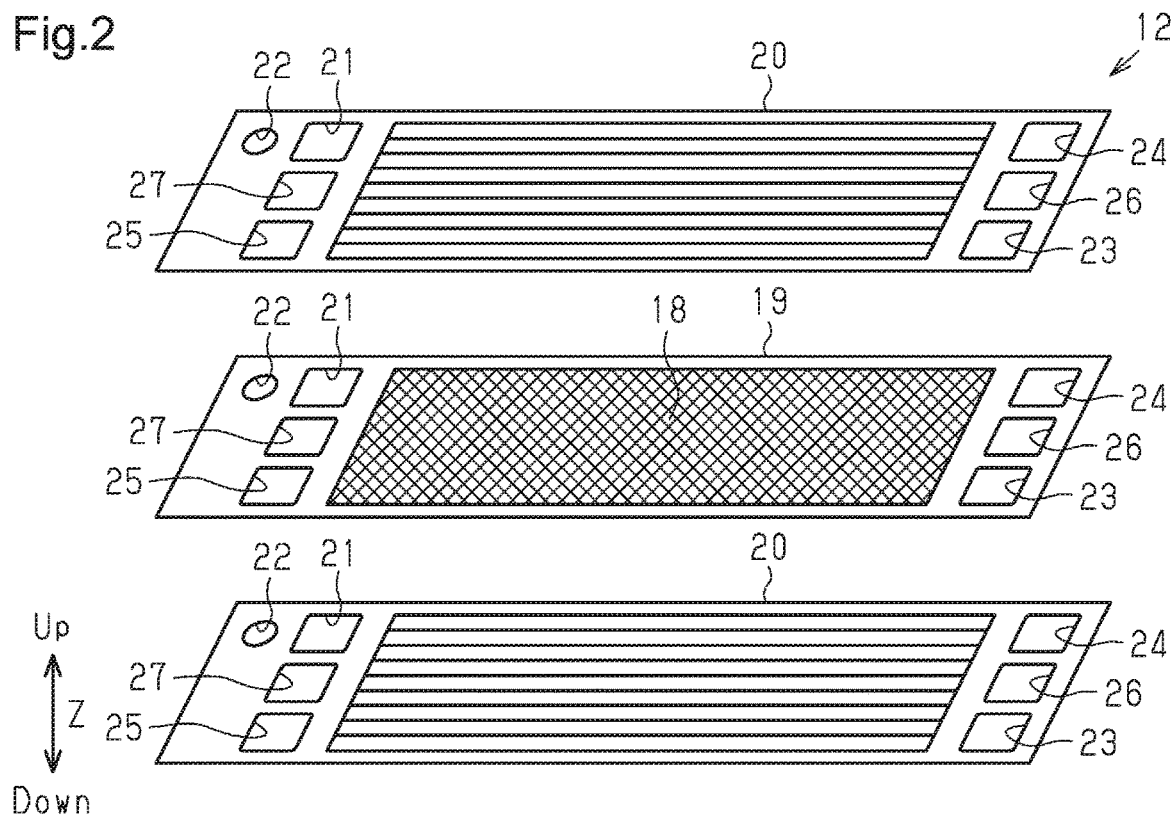
FIG. 2 is an exploded perspective view of a power generation cell.

As shown in FIGS. 1 and 2, each power generation cell 12 includes a rectangular sheet-shaped membrane electrode assembly 18 (MEA), a plastic support frame 19, and two metal separators 20. The support frame 19 includes an opening in a center portion. The support frame 19 supports the membrane electrode assembly 18 at the opening in the center portion. The two separators 20 hold the membrane electrode assembly 18 and the support frame 19 between them in the vertical direction Z.

In each power generation cell 12, fuel gas is supplied to one side in the vertical direction Z (anode side) of the membrane electrode assembly 18, and oxidant gas is supplied to the other side (cathode side) of the membrane electrode assembly 18. The power generation cell 12 then generates power through electrochemical reaction of the fuel gas and the oxidant gas in the membrane electrode assembly 18. Each power generation cell 12 has holes (seven holes in this embodiment) at opposite ends in a longitudinal direction. The seven holes extend through the opposite ends in the longitudinal direction of the support frame 19 and the separators 20.

The seven holes include a fuel gas supplying hole 21, which is one example of a first hole, a passage forming hole 22, which is one example of a second hole, a fuel gas discharging hole 23, an oxidant gas supplying hole 24, an oxidant gas discharging hole 25, a cooling medium supplying hole 26, and a cooling medium discharging hole 27. The fuel gas supplying holes 21 of the power generation cells 12 form a fuel gas supplying passage 28, which is one example of a gas manifold. The gas manifold extends in the vertical direction Z and is supplied with fuel gas, which is one example of gas.

In each power generation cell 12, the passage forming hole 22 is adjacent to the fuel gas supplying hole 21 and on the opposite side of the fuel gas supplying hole 21 from the membrane electrode assembly 18. The passage forming holes 22 of the power generation cells 12 form a passage 29, which is adjacent to the fuel gas supplying passage 28 and on the opposite side of the fuel gas supplying passage 28 from the membrane electrode assembly 18. The passage 29 extends in the vertical direction Z. The fuel gas supplying passage 28 and the passage 29 are connected to each other at the upper ends. Each fuel gas supplying hole 21 of the present embodiment has a rectangular shape, which is one example of a shape. Each passage forming hole 22 of the present embodiment has a circular shape, which is one example of a shape. The area of the fuel gas supplying hole 21 is larger than the area of the passage forming hole 22.

The fuel gas discharging holes 23 of the power generation cells 12 form a fuel gas discharging passage 30, which extends in the vertical direction Z and to which fuel gas is discharged. The oxidant gas supplying holes 24 of the power generation cells 12 form an oxidant gas supplying passage (not shown), which extends in the vertical direction Z and is supplied with oxidant gas. The oxidant gas discharging holes 25 of the power generation cells 12 form an oxidant gas discharging passage (not shown), which extends in the vertical direction Z and to which oxidant gas is discharged. The cooling medium supplying holes 26 of the power generation cells 12 form a cooling medium supplying passage (not shown), which extends in the vertical direction Z and is supplied with cooling medium such as coolant. The cooling medium discharging holes 27 of the power generation cells 12 form a cooling medium discharging passage (not shown), which extends in the vertical direction Z and to which cooling medium is discharged.

Figure 3:
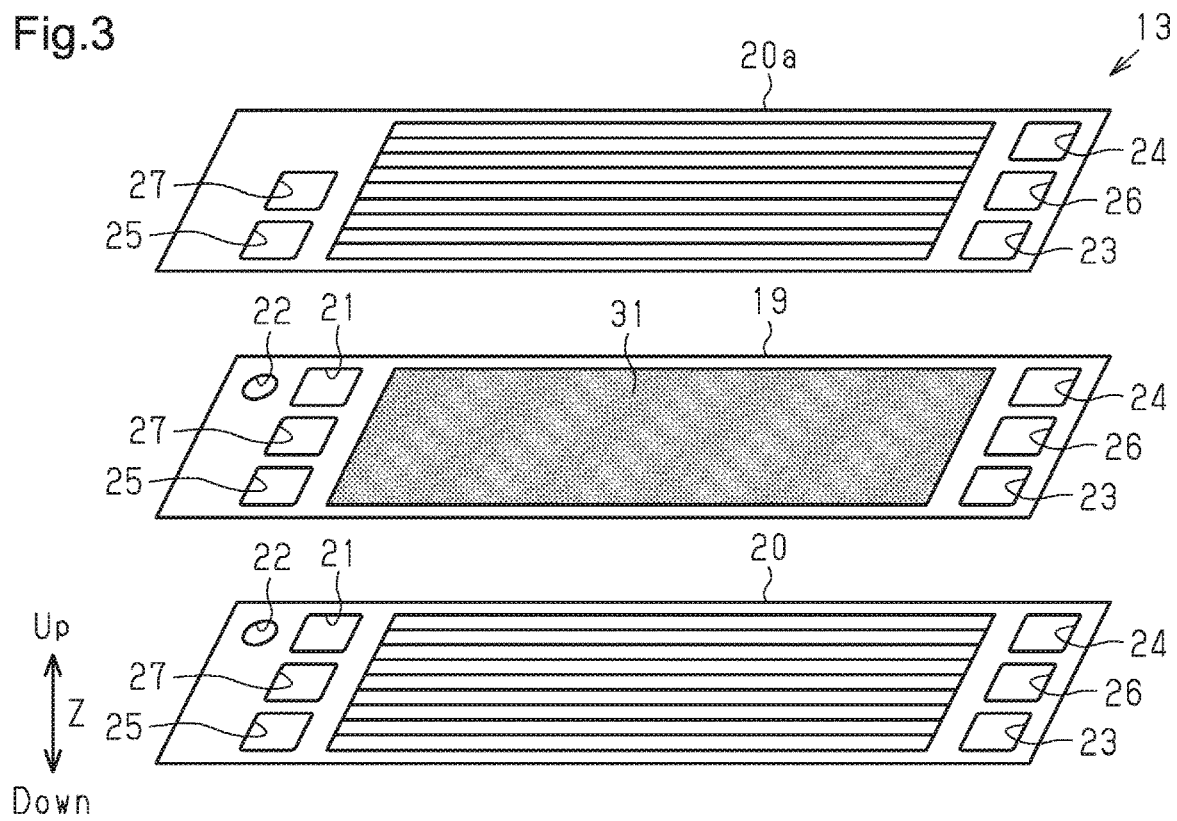
FIG. 3 is an exploded perspective view of a dummy cell.

As shown in FIGS. 1 and 3, the dummy cell 13 is equivalent to the power generation cell 12 in which the membrane electrode assembly 18 is replaced by a rectangular sheet-shaped conductor 31, and the upper separator 20 is replaced by a dummy separator 20a. The dummy cell 13 includes a lower separator that is identical with the separator 20 of the power generation cell 12. That is, the dummy cell 13 includes a conductor 31, a support frame 19 that supports the conductor 31 at an opening in a center portion, the dummy separator 20a, and a separator 20. The conductor 31 and the support frame 19 of the dummy cell 13 are held between the dummy separator 20a and the separator 20 in the vertical direction Z.

The dummy separator 20a has the same structure as the separator 20 of the power generation cell 12 except that the fuel gas supplying hole 21 and the passage forming hole 22 are omitted, and that a protrusion 34 is provided on a lower surface 33, which is one example of a wall surface. Since the dummy cell 13 lacks the membrane electrode assembly 18, the dummy cell 13 does not generate power when supplied with fuel gas and oxidant gas.

The lower surface 33 of the dummy separator 20a is located above a section where the fuel gas supplying passage 28 and the passage 29 are connected to each other. The protrusion 34 is arranged on a part of the lower surface 33 of the dummy separator 20a that corresponds to the section where the fuel gas supplying passage 28 and the passage 29 are connected to each other. The protrusion 34 has a triangular cross-sectional shape. The protrusion 34 includes an inclined surface 35, the height of which decreases from the side corresponding to the fuel gas supplying passage 28 toward the side corresponding to the passage 29. The lowest part of the inclined surface 35 corresponds to the passage 29. The highest part of the inclined surface 35 corresponds to the fuel gas supplying passage 28.

As shown in FIG. 1, the fuel cell stack 11 includes gaskets 36, which respectively provide a seal between one of the terminal plates 15 and the corresponding separator 20, a seal between the other terminal plate 15 and the dummy separator 20a, a seal between each support frame 19 and the corresponding separator 20, a seal between the dummy separator 20a and the corresponding support frame 19, and a seal between the separators 20.

The terminal plate 15, the insulating plate 16, and the end plate 17 that are located at the lower end of the fuel cell stack 11 include a fuel gas supplying port 37, a fuel gas discharging port 38, and a liquid water discharging port 39, which extend through the terminal plate 15, the insulating plate 16, and the end plate 17. The fuel gas supplying port 37, the fuel gas discharging port 38, and the liquid water discharging port 39 are respectively connected to the fuel gas supplying passage 28, the fuel gas discharging passage 30, and the passage 29.

The fuel gas supplying port 37 is connected to a gas supplying pipe 41, which extends from a gas tank 40. The gas tank 40 stores fuel gas. A pressure regulation valve 42 is provided on the gas supplying pipe 41. The pressure regulation valve 42 is configured to regulate the pressure of fuel gas that is supplied to the fuel gas supplying port 37 from the gas tank 40 via the gas supplying pipe 41.

The fuel gas discharging port 38 is connected to the upper end of a first discharging pipe 43, which extends in the vertical direction Z. The fuel gas discharging port 38 discharges unreacted fuel gas that contains water to the first discharging pipe 43. A gas-liquid separator 44 and a first on-off valve 45 are proved on the first discharging pipe 43. The gas-liquid separator 44 is configured to separate water from the unreacted fuel gas discharged from the fuel gas discharging port 38.

The first on-off valve 45 is provided on the first discharging pipe 43 at a position below the gas-liquid separator 44. The first on-off valve 45 is normally closed and is opened when discharging water that has been separated from unreacted fuel gas in the gas-liquid separator 44. A side of the gas-liquid separator 44 and a section of the gas supplying pipe 41 between the pressure regulation valve 42 and the fuel gas supplying port 37 are connected to each other by a coupling pipe 46, which extends horizontally.

A pump 47 is provided on the coupling pipe 46. The pump 47 is configured to deliver, to the gas supplying pipe 41, unreacted fuel gas from which water has been separated by the gas-liquid separator 44. The liquid water discharging port 39 is connected to the upper end of a second discharging pipe 48, which extends in the vertical direction Z. A second on-off valve 49 is provided on the second discharging pipe 48. The second on-off valve 49 is normally closed and is opened when discharging liquid water accumulated in the passage 29.

The terminal plate 15, the insulating plate 16, and the end plate 17 that are located at the lower end of the fuel cell stack 11 include an oxidant gas supplying port (not shown) and an oxidant gas discharging port (not shown), which extend through the terminal plate 15, the insulating plate 16, and the end plate 17. The oxidant gas supplying port and the oxidant gas discharging port are respectively connected to the oxidant gas supplying passage (not shown) and the oxidant gas discharging passage (not shown). A pipe (not shown) is connected to each of the oxidant gas supplying port and the oxidant gas discharging port.

The terminal plate 15, the insulating plate 16, and the end plate 17 that are located at the lower end of the fuel cell stack 11 include a cooling medium supplying port (not shown) and a cooling medium discharging port (not shown), which extend through the terminal plate 15, the insulating plate 16, and the end plate 17. The cooling medium supplying port and the cooling medium discharging port are respectively connected to the cooling medium supplying passage (not shown) and the cooling medium discharging passage (not shown). A pipe (not shown) is connected to each of the cooling medium supplying port and the cooling medium discharging port.

Operation of the fuel cell stack 11 will now be described.

With reference to FIGS. 1 and 4, when the fuel cell stack 11 generates power, fuel gas in the gas tank 40 is supplied to the fuel gas supplying passage 28 via the gas supplying pipe 41 and the fuel gas supplying port 37. The pressure of the fuel gas supplied to the fuel gas supplying passage 28 is regulated by the pressure regulation valve 42. The fuel gas supplied to the fuel gas supplying passage 28 is then supplied to an anode-side surface of the membrane electrode assembly 18 of each of the power generation cells 12, which are located below the dummy cell 13.

A cathode-side surface of the membrane electrode assembly 18 of each power generation cell 12 is supplied with oxidant gas from the oxidant gas supplying port (not shown) via the oxidant gas supplying passage (not shown). Power is generated by the electrochemical reaction of the oxidant gas supplied to the cathode-side surface and the fuel gas supplied to the anode-side surface in the membrane electrode assembly 18 of each power generation cell 12.

Unreacted fuel gas in the membrane electrode assembly 18 contains water and is discharged to the first discharging pipe 43 via the fuel gas discharging passage 30 and the fuel gas discharging port 38. After the gas-liquid separator 44 separates water from the unreacted fuel gas discharged to the first discharging pipe 43, the pump 47 delivers the unreacted fuel to the gas supplying pipe 41 via the coupling pipe 46. The unreacted fuel gas delivered to the gas supplying pipe 41 is supplied again to the fuel gas supplying passage 28 together with fuel gas from the gas tank 40. Unreacted oxidant gas in the membrane electrode assemblies 18 is discharged from the oxidant gas supplying port (not shown) via the oxidant gas discharging passage (not shown).

Since the temperature of the fuel cell stack 11 is relatively high during operation of the fuel cell stack 11, water in the fuel cell stack 11 is in a state of water vapor. Particularly, since fuel gas supplied to the fuel gas supplying passage 28 contains water, water vapor exists in the fuel gas supplying passage 28. Since the fuel gas supplying passage 28 and the passage 29 are connected to each other at the upper ends, some of the water vapor in the fuel gas supplying passage 28 flows into the passage 29.

The temperature of the fuel cell stack 11 drops when the operation of the fuel cell stack 11 stops. The water vapor in the fuel gas supplying passage 28 then condenses to become liquid water W. However, since some of the water vapor in the fuel gas supplying passage 28 has flowed into the passage 29 during the operation of the fuel cell stack 11, the amount of the liquid water W generated in the fuel gas supplying passage 28 due to condensation of the water vapor is reduced.

In addition, some of the water vapor in the fuel gas supplying passage 28 collects and condenses on the lower surface 33 and the inclined surface 35 of the dummy separator 20a above the fuel gas supplying passage 28, so as to become liquid water W. The liquid water W flows along the inclined surface 35 toward the passage 29 and dribbles into the passage 29 due to gravity. This reduces the amount of the liquid water W that dribbles into the fuel gas supplying passage 28 from the lower surface 33 of the dummy separator 20a.

If the fuel cell stack 11 lacked the passage 29, a significant amount of liquid water W would be generated in the fuel gas supplying passage 28 due to condensation of water vapor. The liquid water W then would flow from the fuel gas supplying passage 28 into the gas supplying pipe 41 via the fuel gas supplying port 37 due to gravity.

If the fuel cell stack 11 were used in an area where the temperature can drop to below freezing such as a cold climate area, the liquid water W that has flowed into the gas supplying pipe 41 would freeze. This could clog the gas supplying pipe 41 or freeze the pressure regulation valve 42. As a result, fuel gas would not be readily supplied from the gas tank 40 to the fuel gas supplying passage 28, and the fuel cell stack 11 thus would not be able to start operating easily.

However, the fuel cell stack 11 of the present embodiment includes the passage 29, of which the upper end is connected to the fuel gas supplying passage 28, and the inclined surface 35, which is located above the section where the fuel gas supplying passage 28 and the passage 29 are connected to each other. Thus, the fuel cell stack 11 of the present embodiment allows some of water vapor in the fuel gas supplying passage 28 to flow into the passage 29, and guides, to the passage 29, some of the liquid water W, which is generated in the fuel gas supplying passage 28 due to condensation of water vapor.

The present embodiment therefore reduces the amount of the liquid water W that exists in the fuel gas supplying passage 28 when the temperature drops due to stopping of operation of the fuel cell stack 11. This also reduces the amount of the liquid water W that flows from the fuel gas supplying passage 28 into the gas supplying pipe 41 via the fuel gas supplying port 37 due to gravity. As a result, even if the fuel cell stack 11 is used in an area where the temperature can drop to below freezing such as a cold climate area, the gas supplying pipe 41 is prevented from being clogged by the freezing of the liquid water W, and the pressure regulation valve 42 is prevented from being frozen. The present embodiment thus improves the starting performance of the fuel cell stack 11 in an area where the temperature can drop to below freezing, such as a cold climate area.

The liquid water W accumulated in the passage 29 is smoothly discharged to the outside from the second discharging pipe 48 by opening the second on-off valve 49 when the temperature of the area in which the fuel cell stack 11 is used is not at the freezing temperature of the liquid water W.

The above-described embodiment achieves the following advantages.

(1) The fuel cell stack 11 includes the power generation cells 12, which are stacked in the vertical direction Z. The power generation cells 12 are configured to generate power by using fuel gas. Each power generation cell 12 includes a membrane electrode assembly 18, a support frame 19, which supports the membrane electrode assembly 18, and two separators 20, which hold the membrane electrode assembly 18 and the support frame 19 between them. Each power generation cell 12 includes a fuel gas supplying hole 21 and a passage forming hole 22. The fuel gas supplying holes 21 of the power generation cells 12 form a fuel gas supplying passage 28, which extends in the vertical direction Z and through which fuel gas flows. The passage forming holes 22 of the power generation cells 12 form a passage 29, which is adjacent to the fuel gas supplying passage 28 and extends in the vertical direction Z. The fuel gas supplying passage 28 and the passage 29 are connected to each other at the upper ends.

With this configuration, some of the water vapor in the fuel gas supplying passage 28 flows into the passage 29 when the temperature of the fuel cell stack 11 is relatively high. Thus, when the temperature of the fuel cell stack 11 drops, the amount of liquid water W that is generated due to condensation of water vapor in the fuel gas supplying passage 28 is reduced. This reduces the amount of the liquid water W that flows down into the gas supplying pipe 41 from the fuel gas supplying passage 28 due to gravity. As a result, even if the temperature of the fuel cell stack 11 drops to below freezing, freezing of the liquid water W in the gas supplying pipe 41 will not clog the gas supplying pipe 41 or cause the pressure regulation valve 42 to malfunction.

(2) The fuel cell stack 11 includes a wall surface (the lower surface 33 of the dummy separator 20a) above the section where the fuel gas supplying passage 28 and the passage 29 are connected to each other. The wall surface (the lower surface 33) includes the inclined surface 35, the height of which decreases from the side corresponding to the fuel gas supplying passage 28 toward the side corresponding to the passage 29.

With this configuration, when the water vapor in the fuel gas supplying passage 28 condenses and becomes liquid water W while collecting on the inclined surface 35, the liquid water W flows toward the passage 29 along the inclined surface 35 due to gravity. This readily guides, to the passage 29, the liquid water W which is generated by condensation of water vapor in the fuel gas supplying passage 28.

Modifications

The above-described embodiment may be modified as follows. The above-described embodiment and the following modifications can be combined as long as the combined modifications remain technically consistent with each other.

The inclined surface 35 in the lower surface 33 of the dummy separator 20a may have a higher hydrophilicity than sections in the lower surface 33 other than the inclined surface 35. In this case, the hydrophilicity of the material of the protrusion 34, which has the inclined surface 35, may be higher than the hydrophilicity of the material of the dummy separator 20a. Alternatively, the inclined surface 35 may be coated with a coating material having a hydrophilicity higher than that of the material of the dummy separator 20a. With this configuration, when water vapor collects on a section of the lower surface 33 of the dummy separator 20a other than the inclined surface 35 and condenses to become liquid water W, the liquid water W smoothly flows to the inclined surface 35.

The protrusion 34 may be omitted.

The protrusion 34 may be formed integrally with the lower surface 33 of the dummy separator 20a. Alternatively, the protrusion 34 may be formed separately from the dummy separator 20a and is then attached to the lower surface 33 of the dummy separator 20a.

The protrusion 34 may be formed into a cone or a polygonal pyramid.

The shapes of the fuel gas supplying hole 21 and the passage forming hole 22 may be changed.

The area of the fuel gas supplying hole 21 may be the same as or smaller than that of the passage forming hole 22.

The fuel gas supplying hole 21 and the passage forming hole 22 may have the same shape.

In the fuel cell stack 11, the gas may be oxidant gas, the first hole may be the oxidant gas supplying hole 24, and the gas manifold may be the oxidant gas supplying passage (not shown), which extends in the vertical direction Z and is supplied with the oxidant gas. The passage 29 may be formed such that the upper end of the passage 29 and the upper end of the oxidant gas supplying passage are connected to each other.

The dummy cell 13 may be omitted from the fuel cell stack 11. In this case, in place of the lower surface 33 of the dummy separator 20a, the lower surface of the upper terminal plate 15 may be used as the wall surface that is located above the section where the fuel gas supplying passage 28 and the passage 29 are connected to each other. In this case, the protrusion 34 is provided on the lower surface of the upper terminal plate 15.

The fuel cell stack 11 may be used in a fuel cell system in an automobile such as a battery electric vehicle or a hybrid electric vehicle. Alternatively, the fuel cell stack 11 may be used in a stationary fuel cell system installed outdoors.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel cell stack, comprising power generation cells that are stacked in a vertical direction, the power generation cells each being configured to generate power by using a gas, wherein
   each power generation cell includes:
   a membrane electrode assembly;
   a support frame that supports the membrane electrode assembly; and
   two separators that hold the membrane electrode assembly and the support frame between the separators,
   each power generation cell includes a first hole and a second hole,
   the first holes of the power generation cells form a gas manifold, the gas manifold extending in the vertical direction, and the gas flowing through the gas manifold,
   the gas manifold is a gas supplying passage,
   the membrane electrode assemblies of the power generation cells are configured to be supplied with the gas via the gas supplying passage,
   the second holes of the power generation cells form a passage, the passage being adjacent to the gas supplying passage and extending in the vertical direction, and
   the gas supplying passage and the passage are connected to each other at upper ends of the gas supplying passage and the passage.

2. A fuel cell stack, comprising power generation cells that are stacked in a vertical direction, the power generation cells each being configured to generate power by using a gas, wherein
   each power generation cell includes:
   a membrane electrode assembly;
   a support frame that supports the membrane electrode assembly; and
   two separators that hold the membrane electrode assembly and the support frame between the separators,
   each power generation cell includes a first hole and a second hole,
   the first holes of the power generation cells form a gas manifold, the gas manifold extending in the vertical direction, and the gas flowing through the gas manifold,
   the second holes of the power generation cells form a passage, the passage being adjacent to the gas manifold and extending in the vertical direction, and
   the gas manifold and the passage are connected to each other at upper ends of the gas manifold and the passage, wherein the fuel cell stack further comprises
   a wall surface that is located above a section where the gas manifold and the passage are connected to each other, and
   the wall surface includes an inclined surface, a height of the inclined surface decreasing from a side corresponding to the gas manifold toward a side corresponding to the passage.

3. The fuel cell stack according to claim 2, wherein the inclined surface in the wall surface has a higher hydrophilicity than sections in the wall surface other than the inclined surface.

4. A fuel cell stack, comprising power generation cells that are stacked in a vertical direction, the power generation cells each being configured to generate power by using a gas, wherein
   each power generation cell includes:
   a membrane electrode assembly;
   a support frame that supports the membrane electrode assembly; and
   two separators that hold the membrane electrode assembly and the support frame between the separators,
   each power generation cell includes a first hole and a second hole, the second hole being adjacent to the first hole and on the opposite side of the first hole from the membrane electrode assembly,
   the first holes of the power generation cells form a gas manifold, the gas manifold extending in the vertical direction, and the gas flowing through the gas manifold,
   the second holes of the power generation cells form a passage, the passage being adjacent to the gas manifold and extending in the vertical direction, and
   the gas manifold and the passage are connected to each other at upper ends of the gas manifold and the passage.

* * * * *